United States Patent [19]

Honda

[11] Patent Number: 4,876,613
[45] Date of Patent: Oct. 24, 1989

[54] MANUALLY OPERATED COPIER WITH A DAMPER

[75] Inventor: Iwakazu Honda, Nara, Japan

[73] Assignee: Sharp Kabushiki Kaisha, Osaka, Japan

[21] Appl. No.: 115,441

[22] Filed: Oct. 30, 1987

[30] Foreign Application Priority Data

Nov. 5, 1986 [JP] Japan .............................. 61-169789[U]

[51] Int. Cl.$^4$ ............................................... H04N 1/40
[52] U.S. Cl. ...................................... 358/471; 358/474
[58] Field of Search .......................... 355/8, 51, 68, 84; 358/285, 294

[56] References Cited

U.S. PATENT DOCUMENTS 4,626,925 12/1986 Toyoda ............................... 358/285

FOREIGN PATENT DOCUMENTS 0200967 9/1987 Japan .
0220058 9/1987 Japan .
0234460 10/1987 Japan .

Primary Examiner—Howard W. Britton
Assistant Examiner—Kim Yen Vu
Attorney, Agent, or Firm—Flehr, Hohbach, Test, Albritton & Herbert

[57] ABSTRACT

A manually operated copier has an image reading apparatus which is manually operated for scanning a document to read an image on the document, a printer for printing the image which is thus read, a printer for printing an image on a given sheet of paper and a transportation roller for transporting the sheet out of the copier housing. The transportation roller is placed such that its surface touches the document, the transportation roller is longer than the width of the sheet of paper and the copier further includes a damper for causing the roller to rotate at a uniform speed.

6 Claims, 2 Drawing Sheets

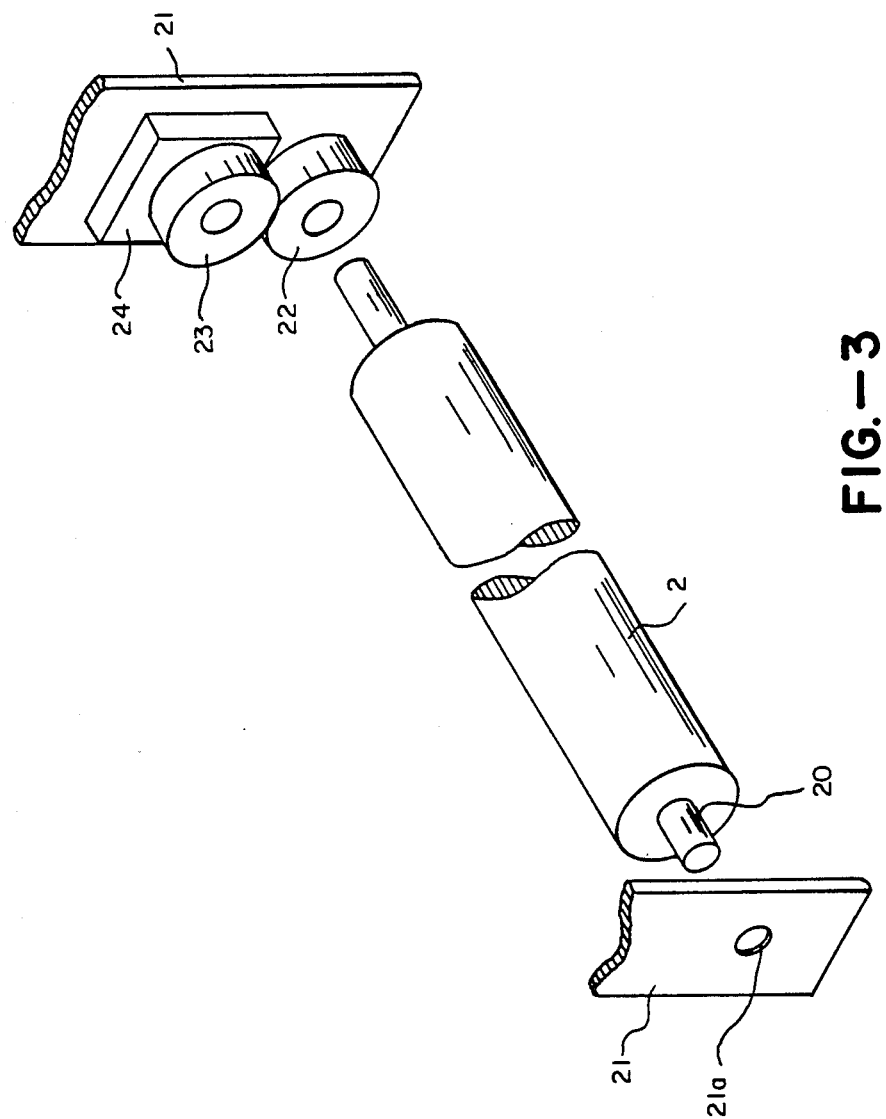
FIG.—3

MANUALLY OPERATED COPIER WITH A DAMPER

BACKGROUND OF THE INVENTION

This invention relates to a manually operated copier which comprises not only an image reading means which is manually operated to scan an original document for reading an image on its surface and a printing means for printing on a given sheet of paper the image thus read but also a transportation roller for transporting the sheet of paper out of the copier housing.

In general, the cost and the size of an electrophotographic copier can be reduced only to certain limits determined by its structure. The copy paper must have at least the size of a postcard, or that of a business card in the case of a miniature copier such as one of a desktop type. When the original document to be copied is extremely small, it is sometimes necessary to perform a preparatory process such as pasting it on a larger sheet of paper before feeding it to the copier. For this reason, there was considered a manually operated copier which is comprised of a small image-reading means such as a CCD and a small printing means such as a thermal printer inside a portable housing and is manually operated to scan an original document to read the image thereon and to print the image on a sheet of paper contained inside. A manually operated copier of this type, however, has the disadvantage of requiring during its manual scanning process that the operator hold an edge of the paper on which the image is printed and pull it out of the copier housing through a transportation roller. Another disadvantage of such a conventional copier is that the image which has been read cannot be correctly printed unless the original document to be copied is scanned at a uniform speed and the sheet of printing paper is pulled out also at a constant rate.

SUMMARY OF THE INVENTION

It is therefore an object of the present invention in view of such disadvantages of prior art copiers to provide a manually operated copier which can not only allow a copy sheet to be automatically pulled out by a transportation roller at the time of a scan but also control the speed of the scan and the speed of the paper being pulled out to be constant.

The above and other objects of the present invention are achieved by providing a manually operated copier of a new kind which not only comprises an image reading means which is manually operated to scan an original document for reading an image on the surface thereof, a printing means for printing on a given sheet of paper the image thus read and a transportation roller for transporting the printed paper out of the copier housing, but also is characterized wherein the roller is so disposed that its surface touches the document surface and is longer than the width of the copy paper and wherein a damper is attached to the axis of the transportation roller so as to cause the roller to rotate at a uniform rotational speed.

With a manually operated copier thus structured, the transportation roller rotates with a part of its surface in contact with the document surface when the document surface is manually scanned, but the speed of this rotation is made uniform by the damper such that not only is the copier housing moved at a constant speed but the copy paper is sandwiched between a part of the roller surface not in contact with the document and the document surface and is pulled out of the copier housing at a uniform speed. As a result, the image is read at a constant speed when the copier scans the document, the copy sheets are transported at a uniform rate and the printing process is carried out correctly.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIG. 3 is a partially broken diagonal view of the transportation roller removed from its supporting pieces.

DETAILED DESCRIPTION OF THE INVENTION

Figure 1:
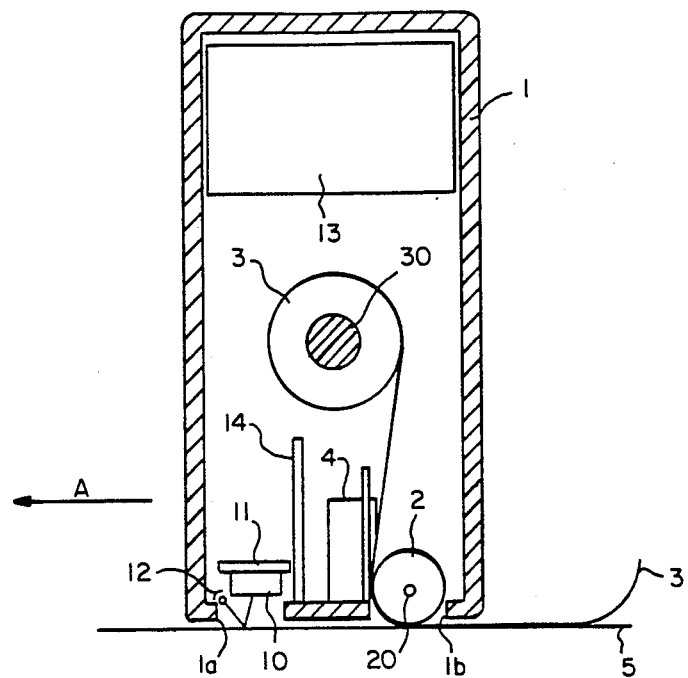
FIG. 1 is a side sectional view of a manually operated copier embodying the present invention.

With reference to FIG. 1 showing a copier embodying the present invention, its housing 1 is generally of a vertically elongated, rectangular box-like shape, having opening edges 1a and 1b on the left-hand and right-hand sides of its bottom surface in the direction perpendicular to the page and containing therein a lens 10, a light receiving element I1 and a light source 12 opposite the left-hand edge 1a. The lens 10 comprises a converging light-transmissive body and the light receiving element 11 comprises a one-dimensional CCD sensor.

When an image is read, light from the source 12 is directed downward out of the housing 1 and the reflected light is passed through the lens 10 and received by the light receiving element 11. The image data thus received by the light receiving element I1 are transmitted to the thermal head to be described below which represents the printing means. In summary, the image data of an original document can be transmitted to the printing means such as a thermal head by moving the housing 1 such that its bottom opening remains opposite to the document surface. Arrow A of FIG. 1 indicates the direction of a scan of this copier.

At the upper part inside the housing 1 is a dry cell 13. At the center is a roller 30 with thermal paper 3 (for printing thereon) wrapped therearound at a uniform width. The roller 30 is axially supported by axis supporting pieces (not shown in FIG. 1) on the front and back surfaces of the housing 1. Disposed opposite the right-hand opening edge 1b of the housing 1 is a platen roller 2 serving as the transportation roller for thermal paper 3 with a small portion thereof protruding outwardly from the right-hand opening edge 1b. The thermal paper 3 is directed downward from the left-hand side surface of the platen roller 2, pressed against the document surface below the platen roller 2 and pulled to the right with respect to the copier housing 1. On the left-hand side of the platen roller 2 is a thermal head 4 serving as the printing means. Still further to the left of the thermal head 4 is a circuit board 14. The image data of the document surface received by the light receiving element 11 are processed by an image processing circuit on the circuit board 14 and then transmitted to the thermal head 4.

Figure 2:
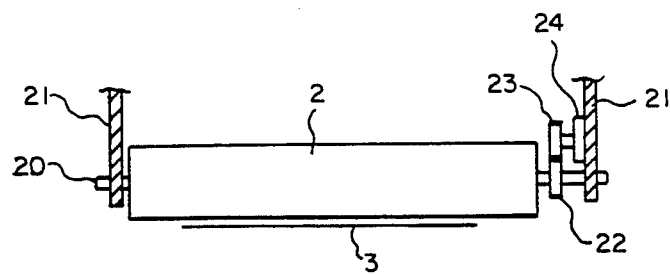
FIG. 2 is a frontal sectional view of the copier of FIG. 1 to show its transportation roller and components nearby.

With reference next to FIG. 2, the platen roller 2 is wider than the thermal paper 3 such that the left-hand and right-hand edge sections of the roller surface do not touch the document surface. The two end sections of the roller axis 20 are axially supported by supporting plates 21. A gear 22 is mounted on the roller axis 20 in engaged relationship with a second gear 23 thereabove. The axis of rotation of the second gear 23 is axially supported by one of the supporting plates 21 on the right-hand side at a higher position. An oil damper 24 is also provided at the right-hand end of the axis of rotation of the second gear 23.

With reference next to FIG. 3, each of the supporting plates 21 is provided with an opening 21a near the center for axially supporting the end sections of the roller axis 20. The oil damper 24 contains oil inside its box-shaped housing. The axis of rotation of the second gear 23 is provided with fins (not shown) where it penetrates the housing of the oil damper 24. When the platen roller 2 rotates, the second gear 23 rotates engagingly with the first gear 22 on the roller axis 20 and the fins also rotate, causing the oil inside the oil damper 24 to flow therearound. This flowing motion of the oil has the effect of uniformizing the rotational speed of the platen roller 2 through the second gear 23.

If the copier housing 1 thus structured is moved glidingly over the document 5 in the direction of the arrow A as shown in FIG. 1, the platen roller 2 which serves as the transportation roller rotates in the counter-clockwise direction with the end sections of the roller surface in contact with the document 5. The thermal paper 3 which is stretched from the left-hand side to the bottom of the roller surface at the center section of the roller surface can thus be pulled out of the housing 1 while it presses the document 5 at the right-hand opening edge 1b. Moreover, since the oil damper 24 is provided, the platen roller 2 is caused to rotate at a constant rate during a scan operation. Since the speed of scanning can be made uniform, the image can be read correctly and the thermal paper 3 can be transported in contact with the thermal head 4 at the same speed. Thus, the image which has been read can be printed correctly on the thermal paper 3.

The foregoing description of a preferred embodiment of the invention has been presented for purposes of illustration and description. It is not intended to be exhaustive or to limit the invention to the precise form disclosed, and many modifications and variations are possible in light of the above teaching. For example, the platen roller 2 need not be connected to the oil damper 24 through a pair of mutually engaging gears 22 and 23. Any modifications and variations that may be apparent to a person skilled in the art are intended to be included within the scope of this invention.

What is claimed is:

1. In a manually operated copier having an image reading means which is manually operated for scanning a document to read an image on said document, a printing means for printing said read image on a given sheet of paper and a transportation roller for transporting said sheet out of said copier, the improvement wherein said transportation roller is so disposed that the surface thereof touches said document, wherein said transportation roller is longer than the width of said sheet of paper and wherein said copier further comprises a damper for causing said roller to rotate at a uniform speed.

2. The copier of claim 1 wherein said damper comprises oil contained in a containing means.

3. The copier of claim 2 wherein said transportation roller is in motion-communicating relationship with a dumper axis which penetrates said containing means.

4. The copier of claim 3 wherein the axis of rotation of said transportation roller and said damper axis are engaged in motion-communicating relationship.

5. The copier of claim 4 wherein mutually engaged gears are affixed respectively to said axis of rotation of said transportation roller and said damper axis.

6. The copier of claim 5 wherein said damper axis is adapted to stir said oil when said transportation roller rotates.

* * * * *